United States Patent
Sang et al.

(10) Patent No.: US 9,876,249 B2
(45) Date of Patent: Jan. 23, 2018

(54) FUEL CELL STACKS WITH INCREASED NATURAL FREQUENCY

(71) Applicants: Daimler AG, Stuttgart (DE); Ford Motor Company, Dearborn, MI (US)

(72) Inventors: Jochen Sang, Kirchheim (DE); Rae Hartwell, Surrey (CA)

(73) Assignees: Daimler AG, Stuttgart (DE); Ford Motor Company, Dearborn, MI (US)

(*) Notice: Subject to any disclaimer, the term of this patent is extended or adjusted under 35 U.S.C. 154(b) by 142 days.

(21) Appl. No.: 15/028,744

(22) PCT Filed: Oct. 16, 2014

(86) PCT No.: PCT/IB2014/002148
§ 371 (c)(1),
(2) Date: Apr. 12, 2016

(87) PCT Pub. No.: WO2015/056084
PCT Pub. Date: Apr. 23, 2015

(65) Prior Publication Data
US 2016/0240881 A1    Aug. 18, 2016

Related U.S. Application Data

(60) Provisional application No. 61/893,150, filed on Oct. 19, 2013.

(51) Int. Cl.
*H01M 8/24*      (2016.01)
*H01M 8/248*    (2016.01)
*H01M 8/1018*  (2016.01)

(52) U.S. Cl.
CPC .... *H01M 8/248* (2013.01); *H01M 2008/1095* (2013.01); *H01M 2250/20* (2013.01); *Y02T 90/32* (2013.01)

(58) Field of Classification Search
CPC ... H01M 8/247; H01M 8/248; H01M 10/0468
See application file for complete search history.

(56) References Cited

U.S. PATENT DOCUMENTS 2,915,208 A * 12/1959 Benschoter ........ B65D 71/0088
                                                            100/2
4,020,244 A *  4/1977 Selinko ............... H01M 2/1077
                                                            429/100

(Continued)

FOREIGN PATENT DOCUMENTS

JP   2007258164 A   10/2007
WO   2012086344 A1   6/2012

OTHER PUBLICATIONS

International Search Report and Written Opinion dated Feb. 5, 2015, in International Application No. PCT/IB2014/002148.

*Primary Examiner* — Matthew J Merkling
(74) *Attorney, Agent, or Firm* — Stephan A. Pendorf; Patent Central LLC

(57) ABSTRACT

In certain configurations and applications, fuel cell stacks can be subject to damage arising from resonance. For instance, the natural frequency of lengthy automotive fuel cell stacks can be low enough to be problematic. Incorporating appropriate support bars between the compression straps holding such stacks together and the fuel cells in the stack can suitably increase the natural frequency in a relatively compact manner.

14 Claims, 3 Drawing Sheets

(56) References Cited

U.S. PATENT DOCUMENTS

| | | | |
|---|---|---|---|
| 5,789,091 A | 8/1998 | Wozniczka et al. | |
| 5,993,987 A | 11/1999 | Wozniczka et al. | |
| 7,858,224 B2* | 12/2010 | Kim | H01M 2/1016 |
| | | | 429/153 |
| 7,858,259 B2* | 12/2010 | Erikstrup | H01M 8/04067 |
| | | | 429/452 |
| 9,425,479 B2* | 8/2016 | Kim | H01M 6/46 |
| 2006/0093890 A1* | 5/2006 | Steinbroner | H01M 8/248 |
| | | | 429/430 |
| 2008/0305368 A1 | 12/2008 | Takahashi et al. | |
| 2010/0040925 A1 | 2/2010 | Hotta et al. | |
| 2013/0260275 A1 | 10/2013 | Ichihara et al. | |
| 2014/0106254 A1 | 4/2014 | Yamano et al. | |

\* cited by examiner

FUEL CELL STACKS WITH INCREASED NATURAL FREQUENCY

BACKGROUND

Field of the Invention

This invention relates to designs and methods for increasing the natural frequency of fuel cell stacks and particularly for increasing the natural frequency to prevent damage from resonance in automotive fuel cell stacks.

Description of the Related Art

Fuel cells such as solid polymer electrolyte membrane fuel cells electrochemically convert reactants, namely fuel (such as hydrogen) and oxidant (such as oxygen or air), to generate electric power. Solid polymer electrolyte fuel cells generally employ a proton conducting, solid polymer membrane electrolyte between cathode and anode electrodes. A structure comprising a solid polymer membrane electrolyte sandwiched between these two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications in order to provide a higher output voltage. Fuel cell stacks can be further connected in arrays of interconnected stacks in series and/or parallel for use in automotive applications and the like.

Fuel cell stacks thus typically comprise numerous, thin, fragile components. For various technical reasons relating to cell function, the dimensions of individual cells in a solid polymer electrolyte fuel cell stack can have high aspect ratios (e.g. length>>width>>>thickness). And in automotive or other vehicle applications, for various reasons relating to vehicle function and design, the desired dimensions of the fuel cell stacks can also have relatively high aspect ratios. In particular, in stacks with numerous cells, the stack height may be much greater than the stack/cell width.

As disclosed in U.S. Pat. No. 5,789,091, for simplicity and in order to minimize weight and volume, stacks may be secured in a compressed, assembled state using one or more compression bands which circumscribe end plate assemblies and interposed fuel cells of the stack. One or more resilient members are preferably employed which cooperate with each compression band to urge the first end plate assembly toward the second end plate assembly. And compressive force is thus applied to promote sealing and electrical contact between the layers forming the fuel cell stack. Strips of electrically insulating material may be interposed between the compression bands and the edges of the fuel cells.

In vehicle applications, the on-board fuel cell stacks are subject to mechanical vibrations when the vehicle is in motion. And like the other components on-board, if the frequency of these vibrations is close to the natural frequency of the fuel cell stack, there is the possibility that the stack can resonate and be damaged as a result. This issue is disclosed in WO2012086344 and a design is proposed for increasing the resonant frequency of the stack without increasing the parts count. Here, a pair of reinforcing plates are connected to the end plates of the stack and cover outer peripheral faces of the laminate of fuel cells.

As development of commercial fuel cell stacks progresses, issues relating to vibration can be encountered more often. This is particularly so for motion induced vibration in vehicle applications. There will therefore be a corresponding need to resolve these issues in a simple manner with minimal increase in weight, volume, and parts count. This invention addresses this need and provides further related advantages.

SUMMARY

The present invention provides designs and methods for increasing the natural frequency of fuel cell stacks and particularly for preventing damage from resonance in automotive fuel cell stacks.

Specifically, such fuel cell stacks comprise a plurality of fuel cells arranged in a series stack with first and second parallel sides. An end plate is provided at each end of the series stack, at least one compression strap is provided adjacent the first side of the series stack, and at least one compression strap is provided adjacent the second side of the series stack. The opposing compression straps are in contact with the end plates at each end of the series stack and they apply compression which urges the end plates together. In addition, an electrically insulating support bar appears between each compression strap and the series stack. These opposing compression straps apply load through the support bars to the first and second sides of the series stack.

In an exemplary embodiment, the opposing compression straps are portions of a single endless compression strap encircling the series stack and the end plates (i.e. a single endless strap acts as the opposing compression straps).

Typically, two or more straps may be employed in more than one location on a fuel cell stack. Thus for instance, the fuel cell stack can comprise two endless compression straps encircling the series stack and the end plates, and electrically insulating support bars between each endless compression strap and the series stack on each of the first and second sides of the series stack.

The invention is useful for fuel cell stacks in which the fuel cells are solid polymer electrolyte fuel cells. Further still, it is useful in stacks whose fuel cells are essentially rectangular, and particularly in stacks whose fuel cells have a relatively high aspect ratio. Such fuel cells have a long side dimension and a short side dimension (representing the first and second sides of the fuel cells respectively) in which the long side dimension is greater than or about 4 times greater than the small side dimension.

Further, the invention is useful in fuel cell stacks in which the natural frequency of the stack absent the support bars is less than 50 Hz. For instance, this can be the case in stacks in which the length of the series stack of fuel cells is greater than about 50 cm. However, incorporation of appropriate support bars can then render the natural frequency of the fuel cell stack to be greater than 50 Hz.

In embodiments of the invention, a suitable tensile loading in the opposing compression straps can be greater than about 3 kN. A suitable shape for the support bars includes shapes which are flat along the faces adjacent the series stack and arc shaped along the faces adjacent the compression straps. And to provide sufficient stiffness, the support bars are suitably thick and can, for instance, have a height at the centre from between about 2.5 and 5 cm.

These and other aspects of the invention are evident upon reference to the attached Figures and following detailed description.

DETAILED DESCRIPTION

In this specification, words such as "a" and "comprises" are to be construed in an open-ended sense and are to be considered as meaning at least one but not limited to just one.

Herein, in a quantitative context, the term "about" should be construed as being in the range up to plus 10% and down to minus 10%.

"Natural frequency" is the rate at which an object will vibrate when it is not disturbed by an outside force.

It has been found that as the number of cells increases in typical conventional solid polymer fuel cell stacks for use in vehicles, the natural frequency of the stacks becomes so low that they become unacceptably susceptible to vibration damage.

Figure 1:
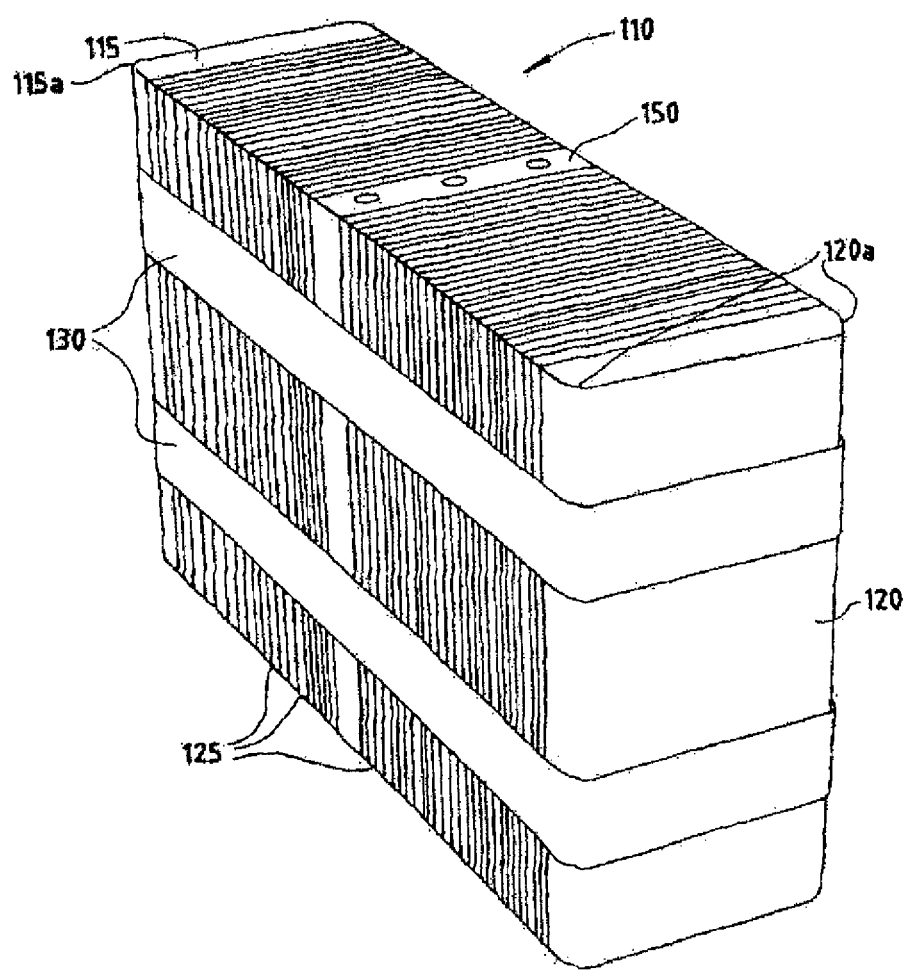
FIG. 1 is a perspective view of solid polymer electrolyte fuel cell stack of the prior art with two compression bands circumscribing the stack.

FIG. 1 shows a perspective view of such a conventional fuel cell stack in which two compression bands circumscribe the stack (this figure has been reproduced from U.S. Pat. No. 5,789,091). Exemplary prior art fuel cell stack 110 includes end plate assemblies 115 and 120 and a plurality of fuel cell assemblies or fuel cells 125 interposed between the end plate assemblies 115, 120. Two compression bands 130 extend tightly around the end plate assemblies and fuel cells and retain and secure stack 110 in its assembled state. According to U.S. Pat. No. 5,789,091, the end plate assemblies 115, 120 preferably have rounded edges 115a, 120a to reduce the stress on the bands. In fuel cell stack 110, reactant and coolant fluid streams are supplied to and exhausted from internal manifolds and passages in stack 110 via a central fluid distribution plate 150. Compression bands 130 can desirably be formed from rolled stainless steel strapping, which can be pre-welded to the desired length to circumscribe the stack. Strips of electrically insulating material (not shown) are interposed between the bands 130 and the edges of the fuel cells 125. The compression bands may be applied to the stack in various ways, for example by slightly over-compressing the stack initially in a fixture during assembly, placing and then welding together the ends of the compression bands around the stack, and finally releasing the stack from the fixture.

Instead of circumscribing the stack with continuous or endless compression bands, an alternative arrangement to that shown in FIG. 1 uses compression straps on either side of the fuel cell stack that are attached at opposite ends to each end plate assembly 115 and 120. This arrangement is generally less preferred because the attachment hardware increases parts count and modestly increases weight and volume.

The fuel cell stack in FIG. 1 comprises fuel cells whose lengths are much greater than their widths. This provides for a simple, desirable flow field arrangement within and also can be a desired profile for incorporation in a vehicle. Further, the stack height (the dimension in the stacking direction) is also much greater than the cell widths or stack width. While such stack configurations can be desirable for operation and integration reasons, they may be susceptible to damage from driving induced vibration. For automotive purposes for instance, a component is generally considered unsuitable if its natural frequency is less than about 50 Hz because such frequencies can be encountered in typical driving duty cycles. It is thus required to somehow increase the natural frequency of such components to be greater than about 50 Hz, and preferably significantly greater than 50 Hz, to use them in automotive applications.

As illustrated in the following examples, fuel cell stacks like that shown in FIG. 1 can have an unsuitably low natural frequency if enough fuel cells are included in the stack and result in the stack height being of order of 50 cm or more.

An elegant solution to this problem however comprises inserting a simple, appropriately shaped electrically insulating support bar between the compression strap and the fuel cell stack, preferably on each side of the stack, such that the opposing compression straps apply enough load through the support bars to the opposite sides of the stack to substantially increase its natural frequency.

Figure 2:
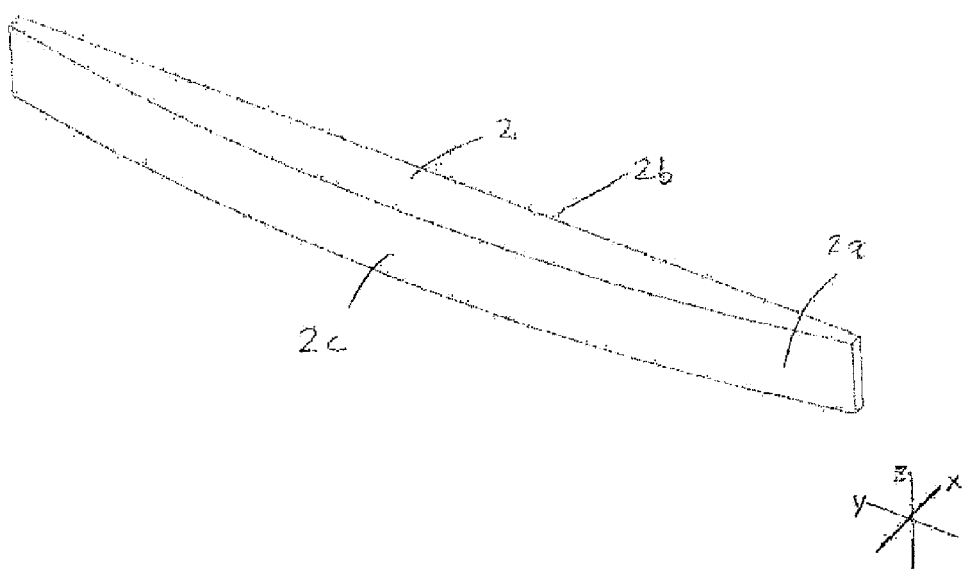
FIG. 2 shows an exemplary support bar shape suitable for use in fuel cell stacks of the invention.

FIG. 2 shows an exemplary support bar shape suitable for use in fuel cell stacks like that shown in FIG. 1. Support bar 2 has an arc shape along face 2a, which is the face that will be adjacent the compression strap when inserted in the stack. Support bar 2 is flat along face 2b, which is the face that will be adjacent the series stack of fuel cells when inserted in the stack. Support bar 2 is made of a suitable electrically insulating material (so as not to electrically short out the cells in the stack) that is also capable of handling the sustained loads involved. For instance, polymers such as polypropylene, polyethylene, glass filled nylon, and the like can be employed. The length and width of support bar 2 matches that of the stack (or most of the stack) and the compression straps employed respectively. The height of support bar 2 is selected such that, in combination with the tensile loading applied by the opposing compression straps, the load applied to the sides of the stack raises the natural frequency of the stack to a sufficient value. In actual embodiments, as shown in the Examples following, the support bar 2 can be of sufficient size if its height at the centre 2c is between about 2.5 and 5 cm. Greater (or lesser) heights can of course be considered and may be appropriate in other circumstances. Greater or lesser heights would be expected to result in a greater or lesser increase respectively in the natural frequency of the stack. While a greater increase in natural frequency is preferred, larger support bars may add unnecessary volume and weight.

Figure 3:
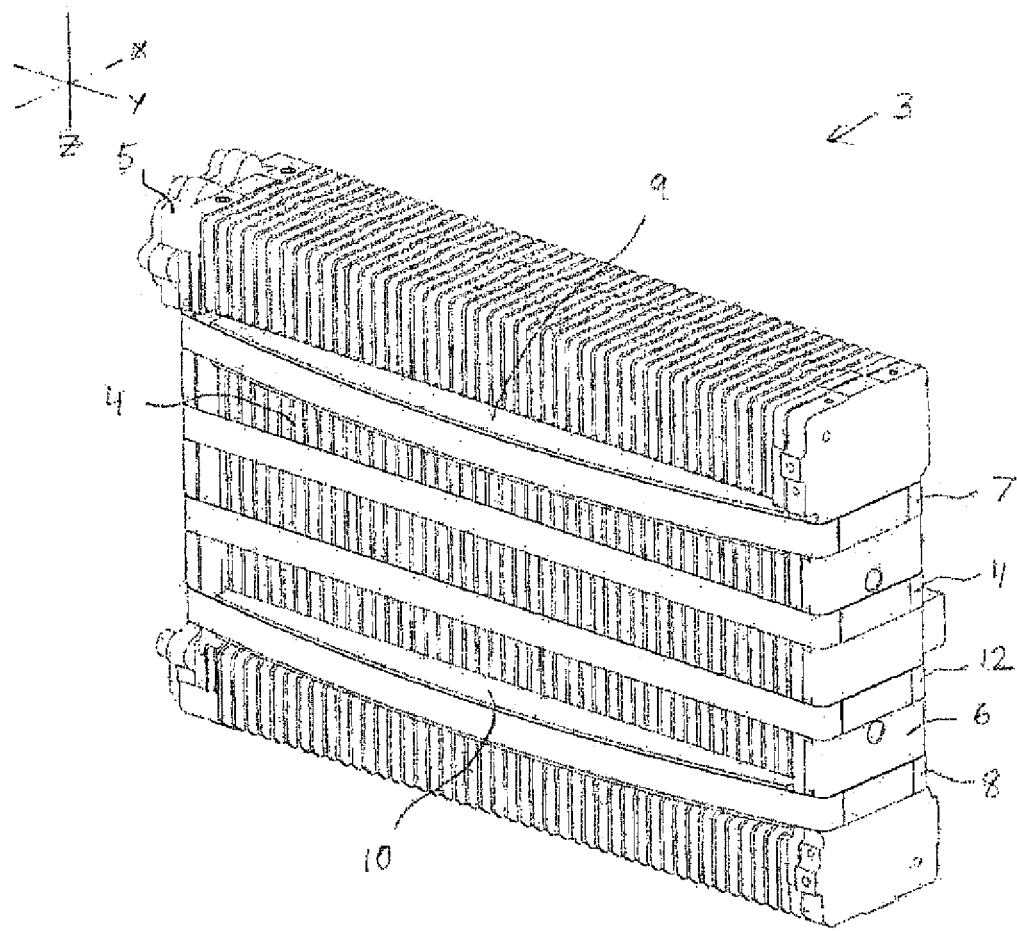
FIG. 3 is a perspective view of a fuel cell stack of the invention comprising two endless compression straps and four support bars.

FIG. 3 shows a perspective view of a fuel cell stack comprising two endless compression straps in which four support bars similar to those shown in FIG. 2 have been inserted between the straps and the sides of the series stack of fuel cells. In FIG. 3, fuel cell stack 3 comprises a series stack of fuel cells 4 between opposing end plates 5, 6. Two endless compression straps 7, 8 encircle stack 3 and secure the components in a compressed state. Support bars 9, 10 are inserted between compression straps 7, 8 and series stack of cells 4. Similar support bars are used on the opposite side of fuel cell stack 3 but are not visible in FIG. 3. (Coordinate axes x, y, and z are provided in FIG. 3 to help indicate the orientation of the support bars and correspond to the coordinate axes shown in FIG. 2.) Note that as shown, compression straps 7, 8 are similar but not identical to those shown in FIG. 2. Here, although not readily visible in the figure, compression straps 7, 8 have been shortened slightly near the end plate 6 end of the stack. Further, although not readily visible in the figure, compression straps 7, 8 have been notched at their other end in order to locate into receiving grooves formed in end plate 5. Further as shown, two additional endless compression straps 11, 12 also encircle stack 3 in order to assist in securing the components in a compressed state. However, support bars are not employed between compression straps 11, 12 and series stack of cells 4.

Tension in compression straps 7, 8 provide a distributed load to support bars 9, 10 which in turn preferably provide a roughly uniform load to the sides of the cells in the stack. Again as illustrated in the following Examples, tensile loads of greater than about 3 kN in the compression straps can provide sufficient loading in actual exemplary stacks to effect a satisfactory increase in natural frequency. And this is accomplished in a tidy manner without an undue increase in weight or volume of the fully assembled stack.

The embodiment shown in FIG. 3 represents a presently preferred stack configuration and uses support bars with a specific effective choice of geometry. However, those of ordinary skill will appreciate that other embodiments may have a significantly different stack configuration and may comprise additional straps in a different range of tension. Further, such embodiments may employ support bars with significantly different geometry and relative dimensions.

The following examples are illustrative of the invention but should not be construed as limiting in any way.

EXAMPLES

Calculated Examples

The natural frequency of an exemplary automotive fuel cell stack was calculated as a function of stack length (or alternatively the number of cells in the stack). The cells were assumed to be essentially rectangular solid polymer electrolyte fuel cells with long and short dimensions of about 40 cm and 10 cm respectively. The length of the series of cells in the stack was considered to vary from about 45 to 65 cm. The overall stack length is about 4 cm greater than the height of the series stack of cells, so the stack length was considered to vary from about 49 to 69 cm. The stack was similar to that shown in FIG. 3 but employed only two endless compression straps and was absent any support bars.

The fuel cell stack was assumed to behave as a simply supported uniform beam characterized by the following parameters: modulus of rigidity of 27 MPa, a moment of inertia of 6260 cm$^4$, a mass/length of 0.977 kg/cm, and a length L in the stacking direction. Using the appropriate equation for natural frequency from Marks' Standard Handbook for Mechanical Engineers, McGraw Hill Professional, 1987, the natural frequencies for such a stack, in the stacking direction, was calculated for several values of length L. The results are tabulated in Table 1 below.

TABLE 1

Calculated natural frequencies versus stack length

| Stack length (cm) | Length of stacked cells (cm) | Natural frequency (Hz) |
|---|---|---|
| 49 | 45 | 54 |
| 54 | 50 | 45 |
| 58 | 54 | 39 |
| 64 | 60 | 32 |
| 69 | 65 | 27 |

For this exemplary stack, it is calculated that the natural frequency will be unacceptably low (below 50 Hz) for stack lengths greater than about 50 cm.

Next, the natural frequency of a fuel cell stack like the above was calculated assuming various support bars similar in shape to that shown in FIG. 2 were employed between each of the two compression straps and on both sides of the fuel cell stack. The stack length was always assumed to be 58 cm and the tension in the compression straps to be 3750 N. However the height at the centre of the support bars was considered to vary from 2.5 to 5 cm. Table 2 shows the calculated range of pressure load applied by the compression straps to the support bars and, in turn, the range of load from the support bars to the stacked cells, along with the calculated natural frequencies in the stacking direction.

TABLE 2

Calculated natural frequencies versus height of support bar

| Support bar height (cm) | Calculated load from strap to bars (kPa) | Calculated load from bars to cells (kPa) | Natural frequency (Hz) |
|---|---|---|---|
| 2.5 | 8.7 to 11.4 | 80 | 61 |
| 3.8 | 9.8 to 14.5 | 100 | 68 |
| 5 | 10 to 16 | 110 | 72 |

The natural frequency increases substantially as the height of the support bar increases. In all cases considered, the natural frequency of the stack has been acceptably increased to significantly greater than 50 Hz.

Actual Example

A mock up experimental automotive fuel cell stack was assembled as described in the preceding calculated examples with a stack length of 58 cm. The stack was mounted on a vibration table and a sine sweep was performed to determine its actual natural frequency along the stack length axis. Here, and as shown in FIG. 3, the long side dimension of the fuel cells lies along the z axis, the short side dimension lies along the x axis, and the stack length dimension lies along the y axis.

Support bars like that shown in FIG. 2 and whose height at the centre was 3.6 cm were then incorporated between the two compression straps and the series stack of cells on both sides of the stack. Again, the stack was mounted on the vibration table and a sine sweep was performed to determine the natural frequency along the stack length axis of the actual fuel cell stack.

For comparison, the natural frequencies for each of the tested stacks along the stack length axis was calculated as above. The results obtained for this actual fuel cell stack are tabulated in Table 3.

TABLE 3

Calculated natural and actual natural frequencies for stacks with and without support bars along the stack length axis

| Calculated natural frequency without support bars (Hz) | Actual natural frequency without support bars (Hz) | Calculated natural frequency with support bars (Hz) | Actual natural frequency with support bars (Hz) |
|---|---|---|---|
| 39 | 37 | 75 | 90 |

In an actual embodiment, the calculated natural frequency was reasonably close to the actual natural frequency along the important stack length direction (y axis in FIGS. 2 and 3). And, incorporating support bars of the invention resulted in a substantial increase in natural frequency (from about 37 to 90 Hz) in the stack length direction.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A fuel cell stack comprising:
    a plurality of fuel cells arranged in a series stack with first and second parallel sides;
    an end plate at each end of the series stack;
    a compression strap adjacent the first side of the series stack and a compression strap adjacent the second side of the series stack wherein the opposing compression straps are in contact with the end plates at each end of the series stack and apply compression urging the end plates together; and
    an electrically insulating support bar between each compression strap and the series stack wherein the opposing compression straps apply load through the support bars to the first and second sides of the series stack,
    wherein the support bars are flat along the faces adjacent the series stack and arc shaped along the faces adjacent the compression straps.

2. The fuel cell stack of claim 1 wherein the opposing compression straps are portions of a single endless compression strap encircling the series stack and the end plates.

3. The fuel cell stack of claim 2 comprising:
    two endless compression straps encircling the series stack and the end plates; and
    an electrically insulating support bar between each endless compression strap and the series stack on each of the first and second sides of the series stack.

4. The fuel cell stack of claim 1 wherein the fuel cells are essentially rectangular with a long side dimension and a short side dimension and the first and second sides are the long and short sides of the fuel cells in the series stack respectively.

5. The fuel cell stack of claim 4 wherein the long side dimension is greater than or about 4 times greater than the small side dimension.

6. The fuel cell stack of claim 1 wherein the tensile loading in the opposing compression straps is greater than about 3 kN.

7. The fuel cell stack of claim 1 wherein the length of the series stack of fuel cells is greater than about 50 cm.

8. The fuel cell stack of claim 1 wherein the height at the centre of the support bars is between about 2.5 and 5 cm.

9. The fuel cell stack of claim 1 wherein the natural frequency of the fuel cell stack absent the support bars is less than 50 Hz and the natural frequency of the fuel cell stack with the support bars is greater than 50 Hz.

10. The fuel cell stack of claim 1 wherein the fuel cells are solid polymer electrolyte fuel cells.

11. A method of increasing the natural frequency of a fuel cell stack, the fuel cell stack comprising a plurality of fuel cells arranged in a series stack with first and second parallel sides, an end plate at each end of the series stack, and a compression strap adjacent the first side of the series stack and a compression strap adjacent the second side of the series stack wherein the opposing compression straps are in contact with the end plates at each end of the series stack and apply compression urging the end plates together, the method comprising:
    inserting an electrically insulating support bar between each compression strap and the series stack such that the opposing compression straps apply load through the support bars to the first and second sides of the series stack, and
    selecting a geometry for the support bars that is flat along the faces adjacent the series stack and arc shaped along the faces adjacent the compression straps.

12. The method of claim 11 comprising selecting a tensile loading in the opposing compression straps and selecting a geometry for the support bars such that the natural frequency of the fuel cell stack is increased from less than 50 Hz to greater than 50 Hz.

13. The method of claim 12 comprising selecting a tensile loading in the opposing compression straps that is greater than about 3 kN.

14. The method of claim 12 comprising selecting a geometry for the support bars wherein the height at the centre of the support bars is between about 2.5 and 5 cm.

* * * * *